Inventor:
Kouan Fong,
by Marvin Snyder
His Attorney.

3,462,551

CHANNEL SYNCHRONIZER FOR MULTIPLEX PULSE COMMUNICATION RECEIVER

Kouan Fong, Schenectady, N.Y., assignor to General Electric Company, a corporation of New York Filed Jan. 3, 1966, Ser. No. 518,205
Int. Cl. H04l 7/00; H04b 1/06; H04j 3/06
U.S. Cl. 178—69.5 8 Claims

ABSTRACT OF THE DISCLOSURE

Pulse modulated receiver having a channel synchronizer which generates sync pulses in response to pulses received at the proper repetition rate and generates sync pulses locally at this repetition rate when pulses at the proper repetition rate are temporarily not received.

Figure 1:
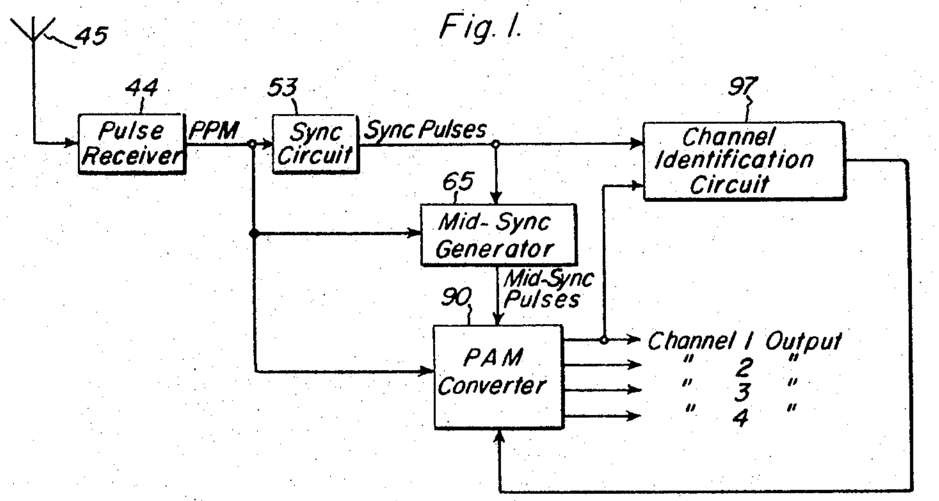

In pulse communication systems wherein pulses are received at other than a perfectly constant repetition rate, such as pulse position modulation (PPM) or pulse code modulation (PCM), it is usually necessary to generate sync pulses in order to obtain reference points from which the extent of modulation of individual pulses may be determined, while simultaneously maintaining coincidence between pulses containing modulation applied to a particular channel at the transmitter and output data produced on corresponding channels at the receiver. Such sync pulses might readily be produced by a pulse generator driven by the received pulses, provided that no modulation were ever applied to the pulses and that there were never any interruptions in the train of received pulses. However, since the pulses must be modulated and since occasional temporary interruptions in the train of received pulses may be inevitable, such sync circuit would be unsatisfactory. For example, loss of but one pulse from the transmitter would cause the entire pulse sequence to shift by one channel at the receiver, so that channel 2 pulses might be received on channel 1, channel 3 pulses on channel 2, etc. Similarly, large amounts of modulation might vary the rate at which sync pulses are produced to an extent sufficient to defeat the purpose of sync pulses, which, to be useful, must be produced at a substantially invariant rate. The importance of proper sync pulses in a communication system may be seen in my copending application Ser. No. 158,376, filed concurrently herewith, and assigned to the instant assignee.

The present invention provides synchronizing means which are rendered immune to the aforementioned disruptive circumstances by capability of both generating sync pulses in response to pulses received at the proper repetition rate, and simultaneously storing this rate. In event of temporary disruption in receipt of pulses at the proper repetition rate, the synchronizing means generates sync pulses locally at the proper repetition rate, which is obtained from storage.

Accordingly, one object of the invention is to provide synchronizing means for a multiplex pulse communication system having capability of storing the proper pulse repetition rate for the system while simultaneously responding to this rate by generating sync pulses for the system.

Another object is to provide synchronizing means for a multiplex pulse communication system wherein synchronization may be maintained locally at the receiver in the temporary absence of received pulses.

Another object is to provide synchronizing means for a pulse position modulated multiplex communication system wherein synchronization may be maintained locally at the receiver even during extreme variations in repetition rate of received pulses.

Briefly stated, the invention contemplates a synchronizing circuit for a multiplex pulse communication system receiver comprising narrow band filter means responsive to pulses received by the receiver, variable frequency pulse generating means supplying sync pulses to the receiver at a rate controllable within narrow limits, and long time-constant comparison means responsive jointly to the variable frequency pulse generating means and the filter means. The long time-constant comparison means provides an output voltage in accordance with the difference in pulse phase sensed therein to sample and hold circuit means. The sample and hold circuit means is gated by threshold detector means so as to control the frequency of the variable frequency pulse generating means in accordance with output voltage amplitude of the signal passed through the filter means.

Figure 2:
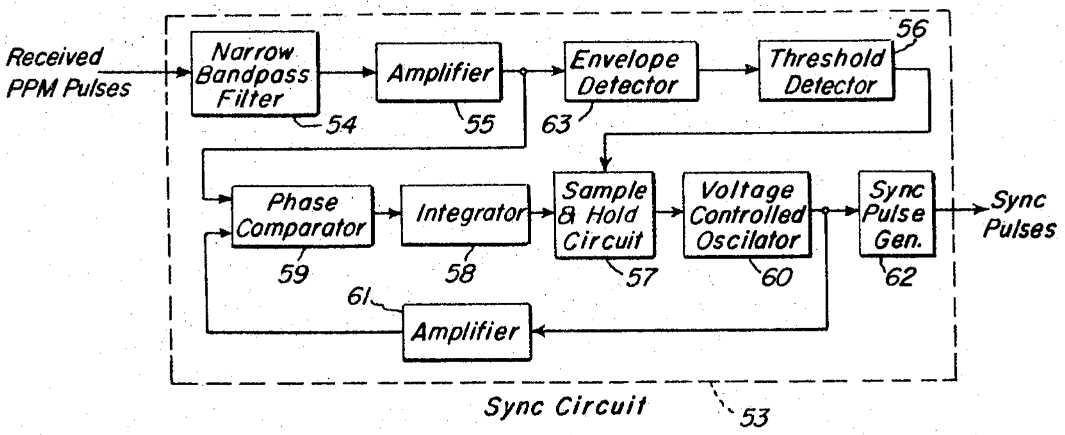

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

FIGURE 1 is a functional block diagram of a multiplex pulse communication receiver utilizing the sync circuit of the present invention; and FIGURE 2 is a block diagram of the sync circuit shown in FIGURE 1.

FIGURE 1 illustrates, in functional form, the receiver shown in my copending application Ser. No. 158,376, filed Jan. 3, 1966, and assigned to the instant assignee. A receiver of this type is particularly adapted to receipt of linear frequency sweeps or "chirps", with the mean frequency of each of the frequency sweeps being proportional to the sampled amplitude of a baseband signal. In the aforementioned copending application, this form of modulation is designated frequency shifted sliding tone or FSST modulation.

FSST signals received from a transmitter at an antenna 45 are supplied to a pulse receiver 44 which contains a dispersive delay line. Thus, each chirp or sliding tone is supplied to the dispersive delay line in pulse receiver 44, thereby compressing the duration of each chirp to a substantially short-duration pulse which is shifted in time from a center frequency in accordance with the mean frequency of the chirp. In particular, chirps of mean frequency above a predetermined frequency level are delayed in time, with respect to pulses produced by unmodulated chirps, while pulses resulting from chirps of mean frequency below the predetermined frequency level are advanced in time, in comparison with pulses resulting from unmodulated chirps. Hence, pulses produced at the output of pulse receiver 44 are position modulated.

The position modulated pulses produced by pulse receiver 44 are supplied to the input of sync circuit 53, a mid-sync generator 65, and a pulse amplitude modulation or PAM converter 90. The channel 1 output of PAM converter 90, as well as output of sync circuit 53, are applied to a channel identification circuit 97, the output of which is supplied to PAM converter 90. Sync pulses are supplied by sync circuit 53 to the input of mid-sync generator 65, while "mid-sync" pulses, or pulses generated midway in time between adjacent sync pulses, are supplied by the output of mid-sync generator 65 to the input of PAM converter 90. PAM converter 90 provides output signals comprising PAM pulses for each of the individual channels communicating data in the system. Although for illustrative purposes the PAM converter in FIGURE 1 is represented as providing output signals for four separate channels of communication, it is clear that other convenient numbers of channels may be contained in the system without altering the principles of operation.

Before amplitude modulated pulses can be provided at the output of PAM converter 90, time reference points must be established in order to determine the amount of modulation on each PPM pulse. To achieve this result, sync pulses are generated by sync circuit 53 in response to the average rate of position modulated pulses produced by pulse receiver 44. These pulses are produced at a substantially invariant repetition rate exactly equal to the average repetition rate at which transmitted pulses are supplied to antenna 45. Mid-sync generator 65, in response to the sync pulses, generates a "mid-sync" pulse exactly midway in time between adjacent sync pulses, thereby delineating a time delay of exactly one-half the sync pulse period following each sync pulse. By providing a voltage output from mid-sync generator 65 beginning upon generation of a mid-sync pulse and ending upon production of the next PPM pulse from pulse receiver 44, a signal representing combined PWM modulation for all channels may be provided, if desired.

Each mid-sync pulse received by PAM converter 90 from mid-sync generator 65 initiates a linear sawtooth voltage wave, and the next-occurring PPM pulse provides momentary amplitude sampling of the linear sawtooth voltage wave so as to produce an output voltage pulse of amplitude directly proportional to the position of the PPM pulse. In this fashion, PPM pulses are converted to PAM pulses and are produced at the output of PAM converter 90. Channel sequence is controlled by channel sequencing means, such as a ring counter in PAM converter 90 which operates in synchronism with each received mid-sync pulse and is advanced one additional step by each pulse generated by channel identification circuit 97. In this manner, each received PPM pulse is conducted to its proper channel in PAM converter 90.

For channel identification, a selected channel, such as channel 1, may be modulated with a constant subsonic or ultrasonic tone at the transmitter. Whenever the channel identification tone fails to occur on the channel 1 output of PAM converter 90 while the channel sequence of the ring counter in PAM converter 90 is in the channel 1 output condition, NOT-AND logic in channel identification circuit 97 supplies the ring counter with an additional pulse occurring midway between a pair of adjacent mid-sync pulses. In this fashion, the channel sequence provided by PAM converter 90 is advanced by a single channel with respect to the incoming PPM pulses, so that a PPM pulse which otherwise would appear on, for example, channel 1, now appears on channel 2. This condition occurs once for each complete channel sequence cycle, until the aforementioned channel identification tone on channel 1 is received by the NOT-AND logic in channel identification circuit 97 while the channel sequencing ring counter is contemporaneously in the chanel 1 output condition. Additional detail regarding operation of the receiver illustrated in FIGURE 1 may be obtained by reference to the aforementioned copending application.

In FIGURE 2, pulses received from pulse receiver 44 of FIGURE 1 are supplied to the input of a narrow bandpass filter 54 of sync circuit 53. This filter preferably has a bandwidth of only a few cycles. Output of narrow bandpass filter 54 is amplified by an amplifier 55 and applied through an envelope detector 63 to a threshold detector 56, which preferably comprises a Schmitt trigger circuit. Threshold detector 56, in response to the envelope of signals passed by filter 54 above a predetermined amplitude, maintains a sample and hold circuit 57 in a conductive condition. Sample and hold circuits are well-known in the art, as shown in M. E. Connelly U.S. Patent No. 3,077,544, issued Feb. 12, 1963, their function being to respond to amplitude of an input signal in response to an external control signal and produce an output voltage level which follows the amplitude of the applied input voltage only during presence of the external signal, remains at a constant level corresponding to the instantaneous applied input voltage at the instant the external signal ceases, and abruptly restores to the level of applied input voltage when the external signal resumes. Thus, a continuously varying input signal is applied via the sample and hold circuit to a voltage controlled oscillator 60 from a relatively long time-constant integrator 58. The integrator, in turn, receives its input signal from a two-input phase comparator 59 having one input energized by amplifier 55 and the second input energized by a constant voltage of comparable amplitude supplied by voltage controlled oscillator 60 through an amplifier 61. The frequency of voltage controlled oscillator 60 is controlled by the output of sample and hold circuit 57, or, in absence of this output, may be internally crystal-controlled.

Voltage controlled oscillator 60, with no input voltage supplied thereto, produces an output signal frequency which drives a sync pulse generator 62 at the center frequency of filter 54. This signal is then supplied to the input of a sawtooth generator in mid-sync generator 65 of FIGURE 1.

When PPM pulses are received from pulse receiver 44 of FIGURE 1, the nature of the modulation, generally, is such that the repetition rate of two adjacent pulses may temporarily be considerably different from the average pulse repetition rate of the transmitter, so that filter 54 temporarily produces no output signal; however, despite short-term variations in the repetition rate of received pulses, integrator 58 maintains a substantially constant output voltage because of its relatively long time-constant. The substantially constant output voltage of integrator 58 is continuously applied to voltage controlled oscillator 60, and sync pulse generator 62 continues to operate at the average pulse repetition rate of the transmitter.

In the event the average pulse repetition rate of the transmitter changes slightly, phase comparator 59 senses a phase difference between the output of bandpass filter 54 and voltage controlled oscillator 60. The comparator responds to this phase difference by providing an output voltage to integrator 58 for sufficient time to effectuate a change in output voltage of sample and hold circuit 57. Output signal frequency of voltage controlled oscillator 60 changes accordingly, until it is once again brought into phase synchronism with the new frequency supplied by narrow bandpass filter 54. Even in event of loss of a few PPM pulses due to temporary interruption in the received signal or attenuation by narrow bandpass filter 54 as a result of high modulation levels, such temporary signal distortion being too brief to appreciably affect output of envelope detector 63, sync pulses continue to be produced at a substantially unchanged rate because of the relatively long time-constant of integrator 58. Loss of more than a few consecutive pulses, however, causes a drop in output voltage level of envelope detector 63 to a value below that required to actuate threshold detector 56. The threshold detector thus opens the circuit coupling integrator 58 to oscillator 60, so that voltage stored on sample and hold circuit 57 maintains the frequency of the oscillator at the value at which it operated immediately prior to the actuation of threshold detector 56. When pulses of sufficient amplitude are once again supplied to threshold detector 56, sample and hold circuit 57 again supplies an output from integrator 58 to oscillator 60 for controlling frequency of the oscillator.

The foregoing describes a synchronizer for maintaining channel sequence of a PPM receiver in synchronism with a transmitter in a multiplex sampled data communication system. The synchronizer maintains synchronization locally at the receiver when the repetition rate of received pulses varies, as well as during temporary absence of received pulses.

While only certain preferred features of the invention have been shown by way of illustration, many modifications and changes will occur to those skilled in the art.

What I claim as new and desire to secure by Letters Patent of the United States is:

1. A synchronizing circuit for a multiplex pulse communication system receiver comprising, narrow band filter means responsive to pulses received by said receiver, variable frequency pulse generating means supplying sync pulses to said receiver at a rate controllable within predetermined limits, long time-constant comparison means responsive jointly to said variable frequency pulse generating means and said filter means and providing an output voltage in accordance with the difference in pulse phase sensed therein, and sample in hold circuit means responsive to said comparison means for intervals controlled by said filter means, said sample and hold circuit means controlling frequency of said variable frequency pulse generating means in accordance with output voltage amplitude of said sample and hold circuit means.

2. The synchronizing circuit of claim 1 wherein said long time-constant comparison means comprises a phase comparator responsive jointly to said variable frequency pulse generating means and said filter means, and long time-constant integrator means responsive to the output of said phase comparator means and providing an output voltage in accordance with the difference in pulse phase sensed therein.

3. The synchronizing circuit of claim 1 wherein said variable frequency pulse generating means comprises a pulse generator for supplying sync pulses to said receiver, and a voltage controlled oscillator drivingly coupled to said sync pulse generator, said voltage controlled oscillator being responsive to the output of said sample and hold circuit means.

4. The synchronizing circuit of claim 2 wherein said variable frequency pulse generating means comprises a pulse generator for supplying sync pulses to said receiver, and a voltage controlled oscillator drivingly coupled to said sync pulse generator, said voltage controlled oscillator being responsive to the output of said sample and hold circuit means.

5. The synchronizing circuit of claim 1 including a threshold detector coupling said sample and hold circuit means to said narrow band filter means so as to control said sample and hold circuit means in accordance with the level of output signals produced by said filter means.

6. The synchronizing circuit of claim 4 including a threshold detector coupling said sample and hold circuit means to said narrow band filter means so as to control said sample and hold circuit means in accordance with the level of output signals produced by said filter means.

7. The synchronizing circuit of claim 1 including an envelope detector responsive to the level of output signals produced by said narrow band filter means and a threshold detector coupling said sample and hold circuit means to said envelope detector so as to control said sample and hold circuit means in accordance with the level of output signal produced by said envelope detector.

8. The synchronizing circuit of claim 4 including an envelope detector responsive to the level of output signals produced by said narrow band filter means and a threshold detector coupling said sample and hold circuit means to said envelope detector so as to control said sample and hold circuit means in accordance with the level of output signal produced by said envelope detector.

References Cited

UNITED STATES PATENTS

| | | | |
|---|---|---|---|
| 2,845,613 | 7/1958 | Pawley. | |
| 3,028,487 | 4/1962 | Losee | 325—322 |
| 3,077,544 | 2/1963 | Connelly | 307—257 |
| 3,084,327 | 4/1963 | Cutler | 325—38 X |
| 3,142,806 | 7/1964 | Fernandez | 325—322 X |
| 3,157,741 | 11/1964 | Bennett | 178—69.5 X |
| 3,375,445 | 3/1968 | Salmet | 325—322 X |

RALPH D. BLAKESLEE, Primary Examiner

U.S. Cl. X.R.

179—15; 325—41